United States Patent [19]

Maxwell et al.

[11] Patent Number: 5,289,909

[45] Date of Patent: Mar. 1, 1994

[54] CHUTE FOR BULK MATERIALS

[75] Inventors: Arthur S. Maxwell, Whitby; Ian R. Barnard, Guisborough, both of England

[73] Assignee: Cleveland Potash Ltd., Cleveland, England

[21] Appl. No.: 911,196

[22] Filed: Jul. 9, 1992

[30] Foreign Application Priority Data

Jul. 12, 1991 [GB] United Kingdom ............... 9115046

[51] Int. Cl.⁵ ............................................. B65G 11/08
[52] U.S. Cl. ....................................... 193/6; 193/25 E; 193/27; 193/30
[58] Field of Search ................. 193/25 E, 6, 30, 2 A, 193/27

[56] References Cited

U.S. PATENT DOCUMENTS

| | | | |
|---|---|---|---|
| 3,949,850 | 4/1990 | Schumm | 193/25 E |
| 4,161,243 | 7/1979 | Grisnich | |
| 4,286,702 | 9/1981 | Langen | |
| 4,363,391 | 12/1982 | Langen | |
| 4,821,861 | 4/1989 | Shanahan | |
| 4,946,018 | 8/1990 | Binzen et al. | 193/27 X |
| 5,086,902 | 2/1992 | Dunnigan | 193/27 X |

FOREIGN PATENT DOCUMENTS

| | | | |
|---|---|---|---|
| 2025017 | 12/1971 | Fed. Rep. of Germany | 193/25 E |
| 0073349 | 3/1983 | Fed. Rep. of Germany | |
| 3632763 | 3/1988 | Fed. Rep. of Germany | 193/25 E |
| 0304020 | 2/1989 | Fed. Rep. of Germany | |
| 1241154 | 7/1971 | United Kingdom | |
| 1513346 | 6/1978 | United Kingdom | |
| 2085135 | 4/1982 | United Kingdom | |
| 2219283 | 12/1989 | United Kingdom | |

*Primary Examiner*—D. Glenn Dayoan
*Attorney, Agent, or Firm*—Rodman & Rodman

[57] ABSTRACT

An improved chute for conveying bulk materials from a higher location to a lower location includes a number of frustoconical hoppers, which are held in vertically-spaced relationship with the conical axes of adjacent hoppers inclined in different directions relative to the longitudinal axis (35) of the chute. The chute is much less liable than prior chutes to cause segregation or degradation of the bulk material being conveyed.

17 Claims, 2 Drawing Sheets

CHUTE FOR BULK MATERIALS

BACKGROUND OF THE INVENTION

The present invention is an improved chute, devised for conveying a bulk material from a higher location to a lower location.

The movement of bulk material, for example ores, sand or bulk foodstuffs, in quantity presents many problems. For example, conventional conveyors may be of limited capacity and may require continuous regular maintenance. Thus in many situations it is preferred to rely upon forced air systems to transfer such bulk materials. However the movement of material by air introduces other problems, not the least of which is that the particles conveyed may become degraded by collision and/or segregated into quantities of different weight or particle size. The generation of quantities of airborne dust is another severe problem; the separation and collection of dust arising in such systems entails the provision of equipment such as cyclones, scrubbers and dust collectors specifically for this purpose.

When it is desired to transfer bulk material of this type from a higher to a lower location, for example in loading bulk ore into the hold of a ship or into a storage silo, even when the transfer is simply by gravity, similar problems arise. If the material is allowed to fall freely over vertical distances, dust generation is substantial. If the material is discharged on to a heap at high velocity, segregation and degradation of the material occurs and dust is generated.

Attempts have been made to reduce these problems by providing loading chutes through which the material is required to flow along a non-linear path between staggered baffles. Such chutes, however, have had only limited success and can readily become damaged and/or blocked in use.

OBJECTS AND SUMMARY OF THE INVENTION

It is therefore an object of the present invention to provide an improved chute for bulk materials, by means of which the foregoing disadvantages of prior systems are reduced or eliminated.

The chute according to the present invention comprises a plurality of generally frustoconical or part-frustoconical hoppers, held in vertically-spaced relationship with the conical axes of adjacent hoppers inclined in different directions relative to the longitudinal axis of the chute. In use of the chute, the bulk material passes in turn through succeeding hoppers and, by virtue of the different inclinations of adjacent hoppers, falls upon an inclined face of each hopper. In this way, the distance of free fall of the material, and the problems associated with such free fall, are minimised.

Each hopper is frustoconical or part-frustoconical. By the latter term is meant that, in plan view, the hopper may take the form of a less than complete circle. In other words, an angular part of the inclined surface of the hopper may be omitted. However, in general it is preferred that each hopper should be in the form of a circumferentially complete frustocone.

The hoppers are mounted, with their narrower ends downwardly of course, at vertically-spaced intervals. The spacing is preferably such that the lower end of one hopper lies within, or at least within the general region of, the upper end of the next adjacent hopper below it. In this way, the distance of free fall of the material between adjacent hoppers is minimised, without unduly limiting the flow capacity of the chute.

Each hopper is supported with its conical axis inclined relative to the longitudinal axis of the chute. The angle of inclination will depend both upon the angle of taper of each frustocone and also upon the nature of the bulk material and the coefficient of friction between that material and the surface of the hopper. Typically, the inclination of each hopper is such that the greatest angle between the inclined face of the hopper and the overall axis of the chute lies in the range from about 30 degrees to about 45 degrees. That is, if the chute is mounted in a position in which its axis is close to the vertical, then the least angle between the face of the cone and the horizontal is of the order of 45 to 60 degrees.

The axes of adjacent hoppers are inclined in different directions relative to the length of the chute but preferably the angle of inclination of each hopper is the same as the next one. Thus, viewed in plan, each axis is displaced angularly around the axial centre of the chute, relative to the next one. Preferably the angle subtended in plan view between the axes of adjacent hoppers is approximately 120° or more preferably approximately 180°.

In one form of the invention, the individual hoppers are so mounted that each hopper can be detached, rotated about its own conical axis and re-attached, to enable a fresh part of its conical surface to be presented to the flow of bulk material when a first part of that surface becomes worn in use. In a preferred form of the invention, a wear-plate in the form of a liner of wear-resistant material, for example of steel or of high-density polyethylene, is detachably secured to an inclined inner surface of each hopper, to enable the surface impacted by falling material to be replaced when it becomes worn.

The actual frustoconical shape of each hopper may be selected to reflect the nature of the bulk material, the material of the hopper itself, and the desired flow capacity of the chute. For example, the conical face of the hopper may subtend an angle at the notional apex of the frustocone of the order of 30 to 70 degrees by way of example, preferably of the order of 40 to 60 degrees.

While in one form of the invention, the plane defined by the circumference of the narrower end of each conical hopper intersects the axis of the hopper at right angles, in a preferred alternative form, that plane intersects that axis at an acute angle, for example of the order of 60 to 70 degrees. When the narrower end of each hopper is notionally "cut away" at an angle in this manner, it becomes possible for the narrower end to project to a greater extent into the wider end of the next succeeding hopper and thereby further reduce the possibility of material which is being conveyed by the chute, and in particular such material in the form of dust or similar fine particles, being lost via the sides of the chute. Hoppers of this type also tend to "nest" together better than hoppers which do not have the plane of their narrower ends inclined to their axis in this way.

The hoppers may be made of a wide range of materials, including synthetic polymeric materials and metals. The bulk material passing through the chute may be highly abrasive and it is therefore desirable that the material of the hoppers be of good wear-resistance. This criterion may be met by forming the hoppers in steel but a lighter-weight result may be achieved by selecting a suitable synthetic polymer, for example high-density polythene or a glass-reinforced plastic, and optionally providing wear-plates as described above.

Conveniently, but not necessarily, the hoppers are all of the same material and preferably all of the same dimensions.

The chute is devised for use in a generally vertical orientation but need not be used strictly vertical. The form of the hoppers is such that the chute may be operated successfully at a small inclination of its axis to the vertical, for example of the order of 5 to 15 degrees.

In use, the hoppers are supported spaced at vertical intervals, as already stated. This is most conveniently achieved by supporting the individual hoppers, at their outer circumferential edge, upon continuous or discontinuous bands extending parallel to the length of the chute. For example, there may be two, three or four such bands, most conveniently three. In one form of the invention the bands are rigid struts, either running the full length of the chute or extending between adjacent hoppers. However in a preferred form of the chute according to the invention, the bands are flexible straps, preferably each extending from the topmost to the bottommost hopper. The adoption of flexible straps between the hoppers allows the whole chute assembly to be collapsed when not required for use, with the hoppers nested within each other in a compact formation. The flexible straps may be made of webbing or of rubberised belting, by way of example.

Further advantages also arise from making the chute retractable in the aforesaid manner. Firstly, by selectively nesting some only of the hoppers, for example those at or in the region of the lower end of the chute, the overall length of the chute may be reduced or increased to adapt it to the overall distance between the feed location and the discharge location for the bulk material. Secondly, when the chute is being used to deliver the bulk material to a heap, the height of which increases as the total volume of material delivered increases, the chute may be retracted to accommodate that increase in height of the pile. This latter retracting may if desired be effected automatically, in response to an electronic signal from a sensor extending downwardly from the lowest hopper.

By virtue of the construction of the chute according to the present invention, the generation of dust arising from the movement of the bulk material is minimised. However, particularly when the chute is in use out-of-doors, ambient winds or draughts may cause dust to fly. To prevent such effects, the whole chute assembly, or at least a major part of its length, may be enclosed in a suitable shroud, which may conveniently be generally cylindrical. The shroud may be rigid or flexible but, when the chute is designed to be collapsible, the shroud is preferably flexible and also collapsible, either with the chute or independently.

DESCRIPTION OF THE DRAWINGS

The invention will now be further described with reference to the accompanying drawings, which illustrate, by way of example only, two preferred embodiments of the chute according to the present invention. In the drawings.

DETAILED DESCRIPTION

Figure 1:
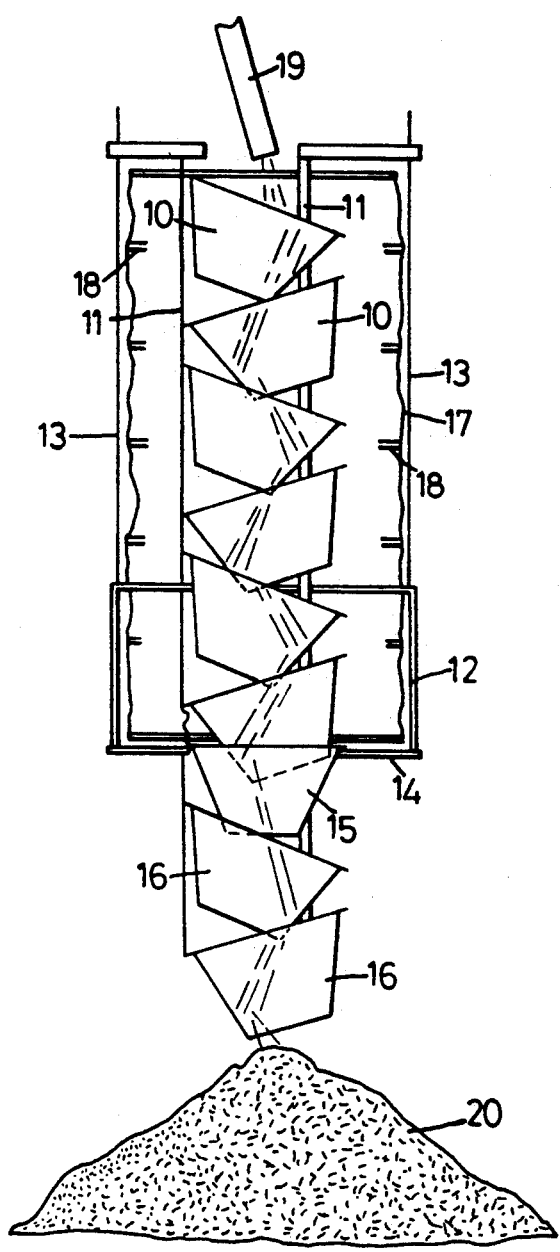
FIG. 1 is a schematic vertical, partly sectional, view of the first form of chute in its operative condition.
Figure 2:
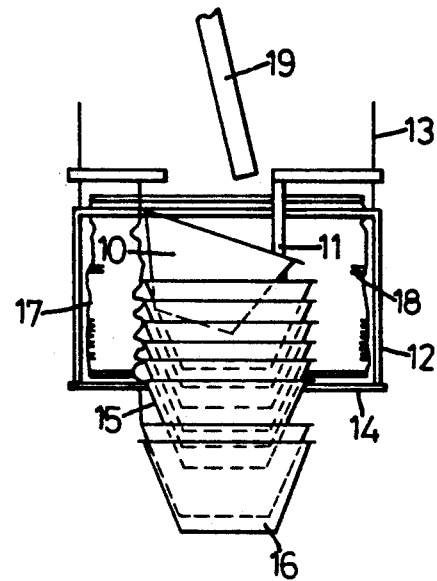
FIG. 2 is a corresponding view of the chute of FIG. 1 in a retracted condition.

The chute illustrated in FIGS. 1 and 2 comprises a number of frustoconical hoppers 10, suspended above each other at small intervals by attachment to three straps 11 at points equally spaced around their circumference. The hoppers are formed in high density polythene and are so mounted that their conical axes are inclined to the vertical by an angle of the order of 20 degrees. The axes of adjacent hoppers are inclined in diametrically opposite directions; that is, in plan view, adjacent axes are displaced by 180 degrees.

A generally annular carriage 12 is suspended, coaxially with the column of hoppers, upon cables 13, by means of which the carriage can be raised or lowered. The base 14 of the carriage has a central aperture which is slightly less in diameter than a peripheral flange which surrounds each hopper 10 and therefore one of the hoppers, 15, is engaged and supported by the base 14. Two further hoppers, 16, are suspended below the carriage 12 in oppositely-inclined orientations similar to that of the hoppers 10.

A PVC shroud 17, braced at intervals by hoops 18, is suspended around the hoppers 10.

For normal operation, the chute is extended, for example as shown in FIG. 1 but not necessarily to its maximum extent. A bulk material, for example a potash ore of 3 mm average particle size, is introduced at 19 at the top of the chute and falls from hopper to hopper down the full height of the chute, to form a heap 20 below the chute, for example in the hold of a ship. The shape and relative arrangement of the hoppers 10, 16 is such that material falling from one hopper drops by a short distance on to the inclined side of the next hopper. In practice, the rate of normal flow of material is such that the material forms a continuous compact stream.

If a shorter column is required, this is readily achieved by raising the carriage 12 by the desired amount. For example, as the height of the heap 20 increases, it may engage a vibrating sensor (not shown) at the lower end of the column and the cables 13 may then automatically raise the carriage. As the carriage is raised, the hopper 10 next above the hopper 15 becomes nested in the hopper 15, the remaining hoppers 10 being nested in succession in a like manner if the carriage is raised further. The nested hoppers can continue to pass the bulk material, although they now form a short linear axial path. If desired, baffles may be provided in one or more of the hoppers 10 to modify that path.

Further raising of the carriage 12, when the chute is no longer required for use, eventually brings the chute to the condition illustrated in FIG. 2, wherein the majority of the hoppers 10 are nested together. Small blocks (not shown) on the underside of the peripheral flanges on the hoppers prevent the nesting becoming too tight and thus difficult to reverse. As the carriage is raised, it also collapses the shroud 17. The chute may be reduced in size further by raising the hoppers 16 manually towards the underside of the base 14 of the carriage.

Figure 3:
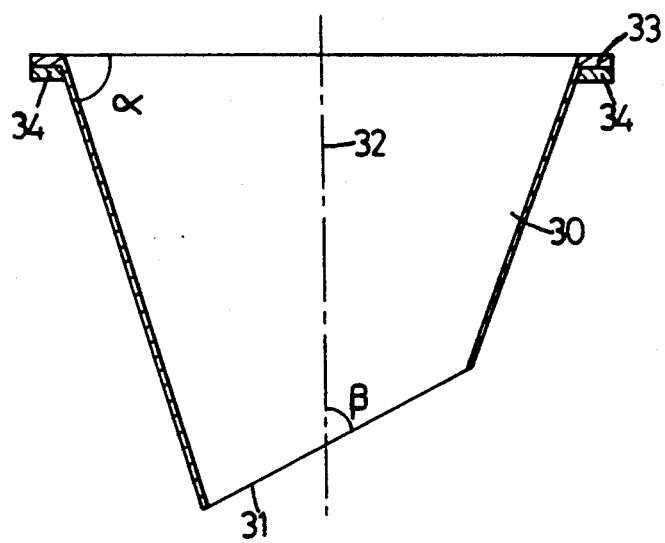
FIG. 3 shows an alternative form of hopper, for use in the second illustrated embodiment of the chute according to the invention.

The frustoconical hopper 30 illustrated in FIG. 3 is generally similar to the hoppers 10 except that the lower edge is not at right angles to the axis of the hopper. Thus the plane defined by that lower edge 31 intersects the axis 32 of the hopper at an angle $\beta$, which typically may be about 60 degrees. The angle of slope $\alpha$ in the illustrated hopper is about 70 degrees, with the result that the frustoconical surface of the hopper subtends an angle of 40 degrees at the notional apex of the cone. The hopper has a peripheral flange 33 at its wider end and a number of blocks 34 are attached on intervals along the underside of the flange 33.

Figure 4:
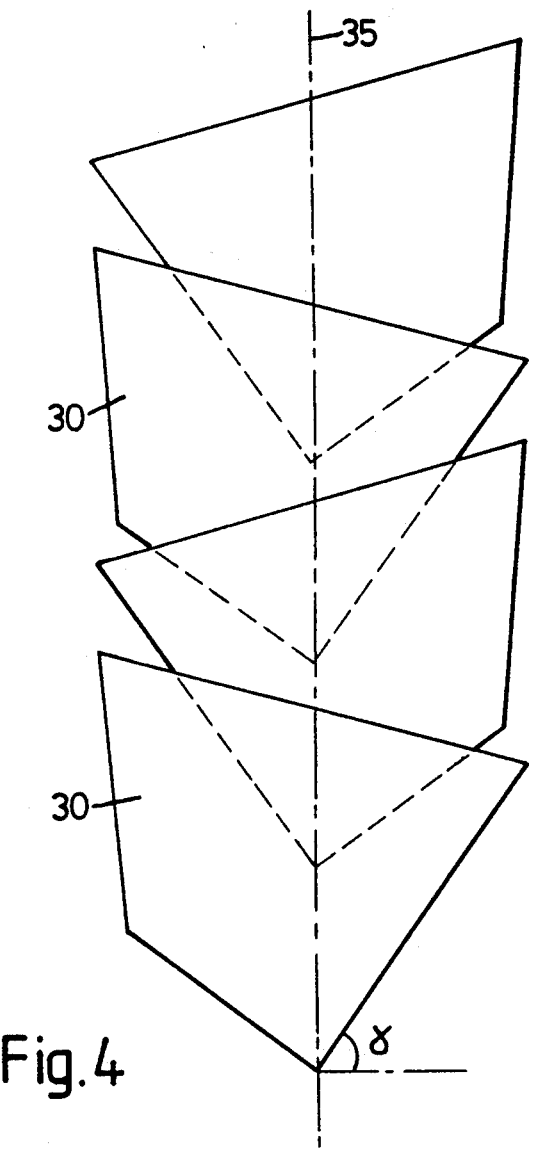
FIG. 4 is a schematic view showing how the hoppers of the type illustrated in FIG. 3 are assembled to form the second embodiment of the chute.

In the assembled extended condition of the second form of the chute, illustrated schematically in FIG. 4, a number of hoppers 30 (of which only four are shown but there may be thirty or forty or more) are suspended in spaced relationship along an axis 35. The conical axis of each hopper is inclined to the axis 35 by an angle of about 15 degrees. Each hopper is displaced by about 180 degrees around the axis 35 relative to the hopper above or below it. Thus the angle $\gamma$ of least slope of the curved surface of each hopper relative to the horizontal will be of the order of 55 degrees (so long as the axis 35 is disposed vertically).

The spacing of the hoppers 30 is such that the lower end of each hopper projects, as shown, to a significant extent into the upper end of the hopper next below it.

Figure 5:
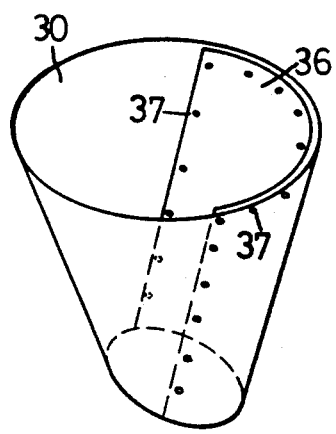
FIG. 5 illustrates a replaceable liner fitted to a hopper of the FIG. 3 type.

Material passing through the illustrated chute falls in each step just the short distance from the inclined face of one hopper to that of the next and therefore segregation of the particles, and degradation forming dust or fine particles, is minimised. However the movement of the material over the hopper surface may be abrasive, depending of course on the nature of the material conveyed. When the surface of a hopper is excessively worn, the hopper may itself be replaced but one preferred possibility is to detachably secure a liner 36 of a wear-resistant material to the inclined surface of the hopper, as illustrated in FIG. 5. The liner may for example be secured by bolts 37, which allow it to be replaced readily when worn.

The improved chute according to the present invention, for example in its two illustrated forms, is very effective for conveying bulk particulate materials of a wide range of types and sizes, with the minimum of degradation and/or segregation of the material and the minimum of dust. By constructing the chute in a retractable form, a single chute may be used to convey materials over a range of vertical distances varying from, say, 2.5 meters to about 20 meters.

Because the improved chute does not rely upon air to convey the material being moved, it is not necessary to install a recovery system (for example cyclones, scrubbers) for dust carried by the air leaving the chute and there is therefore a substantial saving in equipment costs.

In using conventional chutes of the type hitherto available, it has normally been necessary to allow the lower end of the chute to enter the pile of discharged material which forms below the chute, in order thereby to create a seal to prevent lateral discharge of dust-laden air from the chute. If it has then been attempted to move the chute to a new position, for example to fill a ship's hold more uniformly, the movement has frequently led to collapse of the chute. With the chute of the present invention, since dust formation is greatly reduced, it is no longer necessary to immerse the chute end in the pile of discharged material and this risk of chute collapse is therefore avoided.

A further advantage of the chute according to the invention is that, because of the shape and orientation of the hoppers, if a blockage should occur in the region of the bottom of the chute, for example as the result of failure of an automatic chute retraction device, the hoppers will simply spill their contents without the risk of the chute filling and possibly collapsing.

We claim:

1. An chute for conveying bulk materials from a higher location to a lower location, which chute comprises a multiplicity of frustoconical hoppers, said hoppers being supported, at their outer circumferential edge, upon bands extending parallel to a generally vertical axis of the chute so as to space said hoppers along said generally vertical axis with the axes of adjacent hoppers being inclined to said generally vertical axis in different directions, each hopper having a generally downwardly directed narrower end and a generally upwardly directed wider end, the plane of said lower end of each said hopper intersecting the axis of said hopper at an acute angle.

2. A chute according to claim 1, wherein the narrower end of each hopper lies within the wider end of a next adjacent hopper.

3. A chute according to claim 1, wherein the axis of the frustoconical surface of each hopper is displaced around said longitudinal axis of said chute by an angle of about 120 degrees relative to the axis of the frustoconical surface of each adjacent hopper.

4. A chute according to claim 1, wherein said bands are flexible straps.

5. A chute according to claim 1, wherein the axis of the frustoconical surface of each hopper is displaced around said longitudinal axis of said chute by an angle of about 180 degrees relative to the axis of the frustoconical surface of each adjacent hopper.

6. An chute for conveying bulk materials, which chute comprises a plurality of frustoconical hoppers, said hoppers being supported upon bands extending generally parallel to a generally vertical axis with the narrower end of each hopper projecting downwardly into the wider end of the hopper next below it, the frustoconical axis of each hopper being inclined to said generally vertical axis in a direction displaced around said generally vertical axis relative to the frustoconical axis of said next hopper by an angular amount of about 120 degrees.

7. A chute according to claim 6, wherein the angle of least slope of the frustoconical surface of each said hopper, relative to the horizontal, is of the order of 45 to 60 degrees.

8. A chute according to claim 7, wherein each said hopper has a wear-resistant plate detachably secured to said frustoconical surface.

9. A chute according to claim 7, wherein the frustoconical surface of each said hopper subtends an angle of the order of 30 to 70 degrees at the notional apex of the frustocone.

10. A chute according to claim 6, wherein the plane defined by the circumference of the narrower end of each frustoconical hopper intersects the axis of the hopper at an acute angle.

11. A chute according to claim 10, wherein said acute angle is of the order of 60 to 70 degrees.

12. A chute according to claim 6, wherein the plane defined by the circumference of the narrower end of each frustoconical hopper intersects the axis of the hopper at an acute angle.

13. A chute according to claim 12, wherein said acute angle is of the order of 60 to 70 degrees.

14. A chute for conveying bulk materials, which chute comprises a plurality of frustoconical hoppers, said hoppers being supported upon bands which extend generally parallel to the longitudinal axis of said chute so as to space said hoppers along said longitudinal axis with the axes of adjacent hoppers being inclined to said longitudinal axis in different directions, and wherein the angle of least slope of each said frusto-conical surface, relative to a line perpendicular to said longitudinal axis, is of the order of 45 to 60 degrees.

15. A chute for conveying bulk materials, which chute comprises a plurality of frustoconical hoppers, said hoppers being supported upon bands extending generally parallel to a generally vertical axis with the narrower end of each hopper projecting downwardly into the wider end of the hopper next below it, the frustoconical axis of each hopper being inclined to said generally vertical axis in a direction displaced around said generally vertical axis relative to the frustoconical axis of said next hopper by an angular amount of about 180 degrees, and wherein the angle of least slope of the frustoconical surface of each said hopper, relative to the horizontal, is of the order of 45 to 60 degrees.

16. A chute according to claim 15, wherein each said hopper has a wear-resistant plate detachably secured to said frustoconical surface.

17. A chute according to claim 15, wherein the frustoconical surface of each said hopper subtends an angle of the order of 30 to 70 degrees at the notional apex of the frustocone.

* * * * *